US007131678B2

(12) United States Patent
Ernesti

(10) Patent No.: US 7,131,678 B2
(45) Date of Patent: Nov. 7, 2006

(54) MAGNETIC TOOL

(76) Inventor: Carl J. Ernesti, 116 East Phillip Ave., Norfolk, NE (US) 68701

( * ) Notice: Subject to any disclaimer, the term of this patent is extended or adjusted under 35 U.S.C. 154(b) by 57 days.

(21) Appl. No.: 10/912,181

(22) Filed: Aug. 6, 2004

(65) Prior Publication Data

US 2006/0028039 A1 Feb. 9, 2006

(51) Int. Cl.
*B25J 15/06* (2006.01)

(52) U.S. Cl. .................................................... 294/65.5

(58) Field of Classification Search .................... 294/2, 294/24, 65.5; 7/164, 901; 335/285; 248/206.5; 81/125

See application file for complete search history.

(56) References Cited

U.S. PATENT DOCUMENTS 1,068,792 A * 7/1913 Mackintosh .................. 7/116
2,501,757 A * 3/1950 Cagle ............................ 7/145
2,547,990 A * 4/1951 Willms ...................... 294/65.5
2,834,241 A * 5/1958 Chowning .................. 81/125
3,789,336 A * 1/1974 Gordin ...................... 335/285
4,575,143 A 3/1986 Nast
5,169,193 A 12/1992 Stelmach
5,265,887 A 11/1993 Stelmach
5,345,636 A * 9/1994 Lamons ......................... 7/139
5,472,253 A 12/1995 Resor
D378,337 S 3/1997 Reynolds et al.
5,647,623 A 7/1997 Shiao
5,799,999 A 9/1998 Schneider et al.
5,810,409 A 9/1998 Hardie
5,945,901 A 8/1999 Coleman, Jr. et al.
6,048,073 A 4/2000 Shiao
6,065,787 A 5/2000 Jarosch
D446,701 S 8/2001 Coleman, Jr. et al.
6,315,340 B1 11/2001 Chen
6,325,433 B1 12/2001 Nicholson et al.
6,705,654 B1 3/2004 Slauf
2003/0173788 A1 9/2003 Fussell et al.

FOREIGN PATENT DOCUMENTS

DE 929300 6/1955
GB 584156 1/1947
GB 639039 6/1950

* cited by examiner

*Primary Examiner*—Dean Kramer
(74) *Attorney, Agent, or Firm*—Richard C. Litman

(57) ABSTRACT

The magnetic tool has a narrow, elongate, rigid shank having a handgrip end and a selectively extendible and retractable magnet at the opposite working end. Various mechanisms are provided at the handgrip end to extend and retract the magnet. The working end of the tool may be provided with a polygonal (e.g., hexagonal, square, etc.) receptacle for the removable installation of a tool bit or square drive socket therein. The retracted magnet retains the bit or socket within the receptacle as desired. The magnetic tool is particularly well-adapted for insertion into a pushrod passage in the cylinder head of an overhead valve engine, for retracting a valve lifter away from the lobe of the camshaft to facilitate removal and replacement of the camshaft. A linear scale depth gauge may be provided, and an adjustably position-able collar may be provided to hold the tool with the lifter retracted.

11 Claims, 7 Drawing Sheets

MAGNETIC TOOL

BACKGROUND OF THE INVENTION

1. Field of the Invention

The present invention relates generally to magnetized tools of various types, and more specifically to an elongate tool having a selectively extendible and retractable magnetic tip. The present magnetic tool is particularly well adapted for use as a valve lifter or tappet raising tool for use in removing the camshaft from the block of an engine, but may be modified or adapted for other purposes as well.

2. Description of the Related Art

Many, if not most, U.S. automotive and truck engines are constructed with the valve actuating camshaft located in a bore within the engine block, offset from the engine crankshaft. These engines universally use the overhead valve principle, with the valves being actuated by pushrods extending upwardly from the camshaft lobes and acting on rocker arms atop the cylinder head to actuate the valves. Such engines nearly universally use hydraulic tappets or lifters riding on the cam lobes to actuate the valve pushrods. Hydraulic lifters provide many advantages over solid lifters, particularly providing quieter valve train operation and greatly reducing the need for periodic valve adjustments.

From time to time it may be necessary to remove the camshaft from such an engine, due to wear of the cam lobes, desire to install a higher performance cam, or for some other reason. In the past, the labor required for such a job was relatively high, primarily due to the need to remove the cylinder head(s) in order to access the lifters or tappets before removing the camshaft. If the lifters are not removed prior to attempting to remove the cam from its bore in the engine block, the lifters drop downwardly past the cam lobes and bearings as the withdrawal of the camshaft from the block is initiated. As the camshaft continues to be withdrawn, the succeeding cam lobe or bearing encounters the dropped lifter from the adjacent valve in the adjacent cylinder, which blocks further withdrawal of the camshaft from the block. The conventional procedure in providing sufficient clearance to remove the cam from the block is to spend the additional time and labor to remove the cylinder head(s) from the engine to gain access to the lifter bores, and then remove the lifters from their bores.

The present invention provides a solution to the above problem in the form of a magnetic tool which is particularly well adapted for the lifting of hydraulic valve lifters or tappets from the bottoms of their bores in a camshaft-in-block, overhead valve (OHV) gasoline or diesel engine. The present invention comprises a series of embodiments of relatively thin, elongate tools having selectively extendible and retractable magnets in their working tips. Various mechanisms are provided for extending and retracting the magnet in the tip of the tool, as desired. The present tool is used by merely loosening the rocker arms atop the cylinder head of the engine and shifting the rocker arms to one side to access the valve pushrods. The pushrods are withdrawn from their passages through the cylinder head(s), and one of the present tools is inserted into each of the pushrod passages through the head and into the block to contact the valve lifter at the bottom of the passage. The tool is then lifted slightly, withdrawing the lifter from its normal position against the face of the cam lobe to allow withdrawal of the cam from the block. A collar is preferably provided along the shank of the tool to rest against the head and hold the magnetic end of the tool at a sufficient height to maintain the lifter clear of the cam lobes. One of the present tools is applied in each pushrod passage to hold all of the lifters or tappets simultaneously during camshaft removal and installation. The present tool may be modified slightly to provide other functions as well, by forming a square, hexagonal, or other shaped receptacle at the working end to grip a square drive socket, an interchangeable tool bit, or other component as desired.

A discussion of the related art of which the present inventor is aware, and its differences and distinctions from the present invention, is provided below.

U.S. Pat. No. 4,575,143 issued on Mar. 11, 1986 to Irving J. Nast, titled "Pick-Up Tool," describes a mechanical type grasping tool having a series of outwardly springing fingers extending from the tubular end thereof. The fingers are normally withdrawn into the end of the tube by an axial spring at the opposite end of the device. The Nast tool differs from conventional finger-type tools by having a toroidally shaped magnet installed at the finger end of the tool. This configuration teaches away from the present invention, in which the magnet is retractably located within the end of the tube, rather than having mechanical fingers within the tube and the magnet fixed about the exterior of the end of the tube, as in the Nast device. Moreover, Nast does not note any dimensions for the diameter of the magnet at the gripping end of his tool. It would appear that the diameter of the magnet is too large to pass through the relatively narrow pushrod bore provided through the head of a conventional OHV engine.

U.S. Pat. No. 5,169,193 issued on Dec. 8, 1992 to John J. Stelmach, titled "Magnetic Pickup Tool," describes an elongate tool having a retractable magnet in the working end or tip thereof. A flexible wire extends through the tubular shank of the tool to control the position of the magnet. As in the case of the Nast tool above, the Stelmach tool is quite flexible in order to provide the versatility required for picking up various objects which have fallen into relatively inaccessible locations. Stelmach provides a rigid tubular jacket around his flexible tube, but the rigid tube is removable. In contrast, the present tool includes a rigid tubular housing as a permanent component of the device. As in the Nast tool discussed immediately above, Stelmach does not make any disclosure regarding the diameter of his tool and its suitability for passage through the relatively narrow bore provided in a cylinder head for a valve pushrod. Moreover, neither Stelmach nor Nast provides any means of securing their tools in position at a predetermined height within a passage, as provided by the present tool.

U.S. Pat. No. 5,265,887 issued on Nov. 30, 1993 to John J. Stelmach, titled "Magnetic Pickup Tool," is a continuation in part of the '193 U.S. patent to the same inventor, discussed immediately above. The '887 continuation patent includes a different, more rounded tip at the working end of the tool, but the same points of distinction between the '193 tool and the present invention are seen to apply here as well.

U.S. Pat. No. 5,472,253 issued on Dec. 5, 1995 to John R. Resor, titled "Welder's Debris Pick Up Tool" describes a rigid, elongate tool having a fixed magnetic shank extending from a non-magnetic handle to the working tip of the device. This enables the device to pick up magnetically attractive pieces at any point along its length. The provision of an exposed magnetic shaft is undesirable in the present invention, as it would make the tool difficult to position within a cast iron engine block.

U.S. Pat. No. 5,647,623 issued on Jul. 15, 1997 to Hsuan-Sen Shiao, titled "Telescopic Shaft Magnetic Retriever," describes a device having a multiple segment telescoping shaft with a small battery powered light coaxially installed at the working tip thereof. A single button type magnet is placed over the end of the light. The magnet is not retractable, and the diameter of the device would appear to be too large to fit within the narrow pushrod bore through the cylinder head of an engine, due to the light assembly at the working end thereof.

U.S. Pat. No. 5,799,999 issued on Sep. 1, 1998 to Cyril B. Schneider et al., titled "Magnetic Retrieving Tool," describes another flexible elongate tool having a retractable magnetic tip. The magnetic tip may be locked in an extended or retracted configuration, as desired. The flexibility of the device results in a tool more closely resembling the tool of the '143 U.S. patent to Nast, than it does the present invention.

U.S. Pat. No. 5,810,409 issued on Sep. 22, 1998 to Richard J. Hardie, titled "Magnetic Retrieval Device," describes another device having a flexible shaft (formed of rubber hose, in this case) with a magnet in the working tip thereof. While the magnet is retained by a wire extending the length of the tube to a handle at the handgrip end of the device in at least one embodiment, Hardie makes no provision for the retraction or extension of the magnet beyond the tip of the tube. Moreover, Hardie specifies that the tube has a ¼ inch internal diameter, which in view of the cross sectional drawings provided would appear to result in a tool having an external diameter too large to pass through the pushrod bore in the cylinder head of an engine.

U.S. Pat. No. 5,945,901 issued on Aug. 31, 1999 to Edward S. Coleman, Jr. et al., titled "Magnetic Head For Magnetic Pick-Up Tool," describes various embodiments of an elongate tool having a magnetic working tip. A slidable, magnetically attractive sleeve is provided over the magnet to concentrate the magnetic attraction of the magnet. FIG. 6 of the drawings shows a hand grip having finger indentations therein, with the hand grip having about the same diameter as the sleeve disposed about the magnet. The magnet with its surrounding sleeve is thus apparently too large to fit into a pushrod bore through the cylinder head of an engine, which operation is one of the primary purposes of the present invention.

U.S. Pat. No. 6,048,073 issued on Apr. 11, 2000 to Hsuan-Sen Shiao, titled "Telescopic Hand Tool," describes an elongate tool having a series of interchangeable tool elements for the working end thereof. The working end of the tool includes a magnet within a socket, with the socket having external threads thereon. Most of the tool elements secure to the working end of the tool shank by means of an external socket having internal threads which secure to the socket of the working end of the tool shank. The device includes provision for screwdriver bits and the like which insert into the socket of the working end of the tool, in at least some embodiments. However, the magnet is fixed in a permanently retracted configuration in order to provide a magnetically retractable receptacle for the tool bit, as is known in the art. This configuration cannot be used to lift a magnetically attractive component which is larger than the internal diameter of the receptacle, as the magnet is positioned at some distance from the article to be attracted and cannot exert sufficient magnetic force to draw the article away from its initial position. In contrast, the present magnetic tool provides for the selective extension of the magnet beyond the working end socket of the tool, to allow the magnet to come into direct contact with the object being magnetically moved.

U.S. Pat. No. 6,065,787 issued on May 23, 2000 to Robert M. Jarosch, titled "Retriever Tool," describes a tool having double opposed telescoping end sections from a central portion. Several means of attracting or attaching one of the working ends of the tool to another component are provided, including a magnet disposed in one end of the tool. The magnet cannot be retracted within its installed end, as provided by the present invention. Moreover, the increasingly larger widths or diameters of the telescoping sections toward the working ends of the tool, preclude insertion of either working end into the relatively narrow pushrod passage in the cylinder head of an engine.

U.S. Pat. No. 6,315,340 issued on Nov. 13, 2001 to Andrew Chen, titled "Multifunctional Pick-Up Tool," describes a device having a retractable mechanical claw or fingers selectively extending from the working end, with a small light and a small magnet installed beside the opening for the claw. The plurality of components in the working end of the tool results in the working end being too large to fit within the pushrod passage of an engine cylinder head, as provided by the present invention.

U.S. Pat. No. 6,325,433 issued on Dec. 4, 2001 to Roy V. Nicholson et al., titled "Magnetic Metal Object Retriever With Cover," describes a hand carried tool having a relatively large diameter, flat magnetic plate extending from one end. The tool is drawn over a surface (floor, etc.) by a walking person carrying the device and used to pick up magnetically attractive debris (nails, screws, etc.). A magnetically permeable cover is removably installed over the magnet, with the magnet attracting articles through the cover. The cover is removed to remove the attracted articles from the tool, with the articles falling from the cover when it is removed. The magnet is much too large to be inserted within a pushrod bore of an engine cylinder head, and no retraction of the magnet is provided by Nicholson et al.

U.S. Patent Publication No. 2003/173,788 published on Sep. 18, 2003 and applied for by James Fussell et al., titled "Recovery Device And Unit," describes a hand carried device having a retractable head which carries an adhesive pad thereon. The pad is used to pick up various articles which may be hazardous in the event of direct contact to a person. When the adhesive pad has been used it is retracted into the head, which dislodges the pad from its attachment to the tool for disposal. Fussell et al. make mention of an alternative magnetic means, but no magnetic embodiment is specifically disclosed. In any event, the Fussell et al. tool is much too large for use in the intended environment of the present invention.

U.S. Pat. No. 6,705,654 issued on Mar. 16, 2004 to L. Johnny Slauf, titled "Frisbee Golf Disc Retriever And More," describes another relatively large, hand carried tool having a folding tubular body secured by an elastic tension member extending therethrough. This construction cannot provide for a rigid compression member extending through the body to selectively extend a magnet from the working end thereof, as provided by the present invention. As in the case of Fussell et al., Slauf makes mention of a magnetic component on the working end of his device, but none of the pickup devices disclosed by Slauf can be retracted into the working end of the tool.

U.S. Design Pat. No. 378,337 issued on Mar. 11, 1997 to Mark F. Reynolds et al., titled "Telescoping Magnet," illustrates a design having a swivel attached magnet at the working end thereof, with a series of relatively short telescoping sections extending from the handle portion of the device. No retraction of the magnet into the working end of the device is apparent.

U.S. Design Pat. No. 446,701 issued on Aug. 21, 2001 to Edward S. Coleman, Jr. et al., titled "Magnet Head for Magnetic Retrieval Tool," illustrates a design for a magnetic tool head, apparently for use with the tool of the '901 U.S. patent to the same inventors. The device of the '901 U.S. patent was discussed further above, with the same points noted in that discussion appearing to apply here as well. In addition, it is noted that no retraction of the magnet is apparent in the device of the '701 U.S. Design Pat.

British Patent No. 584,156, published on Jan. 8, 1947, titled "An Improved Permanent Magnet Appliance," describes a tool having a flexible shaft with a bar magnet at one end and a horseshoe magnet at the opposite end. No means of retracting the magnet into a sleeve at either end, is disclosed.

British Patent No. 639,039, published on Jun. 21, 1950, titled "Improvements In Or Relating To Permanent Magnets," describes a tool comprising an elongate rod of flexible metal with a generally cylindrical housing for a magnet attached to the working end of the rod. The magnet is permanently affixed in the end of the tool, and cannot be retracted or extended. One embodiment discloses the magnet being housed in the base of a socket with the socket walls extending beyond the magnet, as in conventional screwdrivers and the like having interchangeable bits. The socket is adapted to f it the head of a bolt or the like, which would apparently make the outer diameter of the socket too large to fit into a pushrod passage in the cylinder head of an engine. The patent describes various uses for the tool, including withdrawing parts or debris from engine oil sumps, transmissions, and differentials, but these areas are universally provided with relatively large access panels or are removed for mechanical work. Thus, the interiors of such components are readily accessible with large tools.

Finally, German Patent No. 929,300 published on Jun. 23, 1955, includes only a single drawing apparently illustrating a tool having a selectively retractable magnet within the working end. A spring within the device apparently urges the magnet to an extended position, with a finger grip provided to retract the magnet within its housing at the working end of the tool. A cover is placed over the end of the magnet and housing, thereby completely enclosing the magnet. It would appear that withdrawal of the magnet from the cover would dislodge any magnetically attracted material from the working end of the tool. Thus, the device of the '300 German Patent appears to be more closely related to the magnet and removable cover of the '433 U.S. patent to Nicholson et al., discussed further above, than it is to the present invention. In any event, the relatively wide flare of the working end of the device of the German disclosure would appear to preclude its use in retracting valve lifters or tappets, for which purpose the present invention is adapted.

None of the above inventions and patents, taken either singly or in combination, is seen to describe the instant invention as claimed. Thus a magnetic tool solving the aforementioned problems is desired.

SUMMARY OF THE INVENTION

The present magnetic tool essentially comprises a narrow, elongate, tubular body or shank having a handgrip end and a selectively retractable magnet at its opposite working end. The magnet may be extended as desired by manipulating a mechanism at the handgrip end. The magnet retraction and extension mechanism may comprise an alternating pushbutton mechanism, similar to the mechanism used in retractable ball point pens, a threadably extendible and retractable rod, a slot and latch mechanism, or other mechanism as desired.

The narrow diameter of the device makes it particularly well suited for extending through the pushrod passage in the cylinder head of an overhead valve engine, in order to retract the valve lifter or tappet away from the camshaft lobe for the removal of the cam from the engine block in a pushrod type overhead valve (OHV) engine. The present tool includes additional features which provide further utility for such use. A selectively positionable collar may be installed about the shank of the tool, and secured in position against the cylinder head to hold the tool in position with the tappet lifted away from the cam. A linear measurement scale may also be provided along the shank for a user of the tool to measure hole depths, determine cam lobe position by the height of the lifter in its bore within the engine, etc. Other embodiments of the present magnetic tool include polygonal working ends (e.g., square and hexagonal sockets) for the selective removable installation of square drive sockets, interchangeable screwdriver bits, etc. therein.

These and other features of the present invention will become readily apparent upon consideration of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a series of embodiments of a magnetic tool, with a primary function of the tool being the temporary retraction of a valve lifter for clearance from the cam lobes in an in-block camshaft, overhead valve (OHV) spark ignition or diesel engine. However, the present tool includes additional embodiments which enable it to perform other functions as well.

Figure 1:
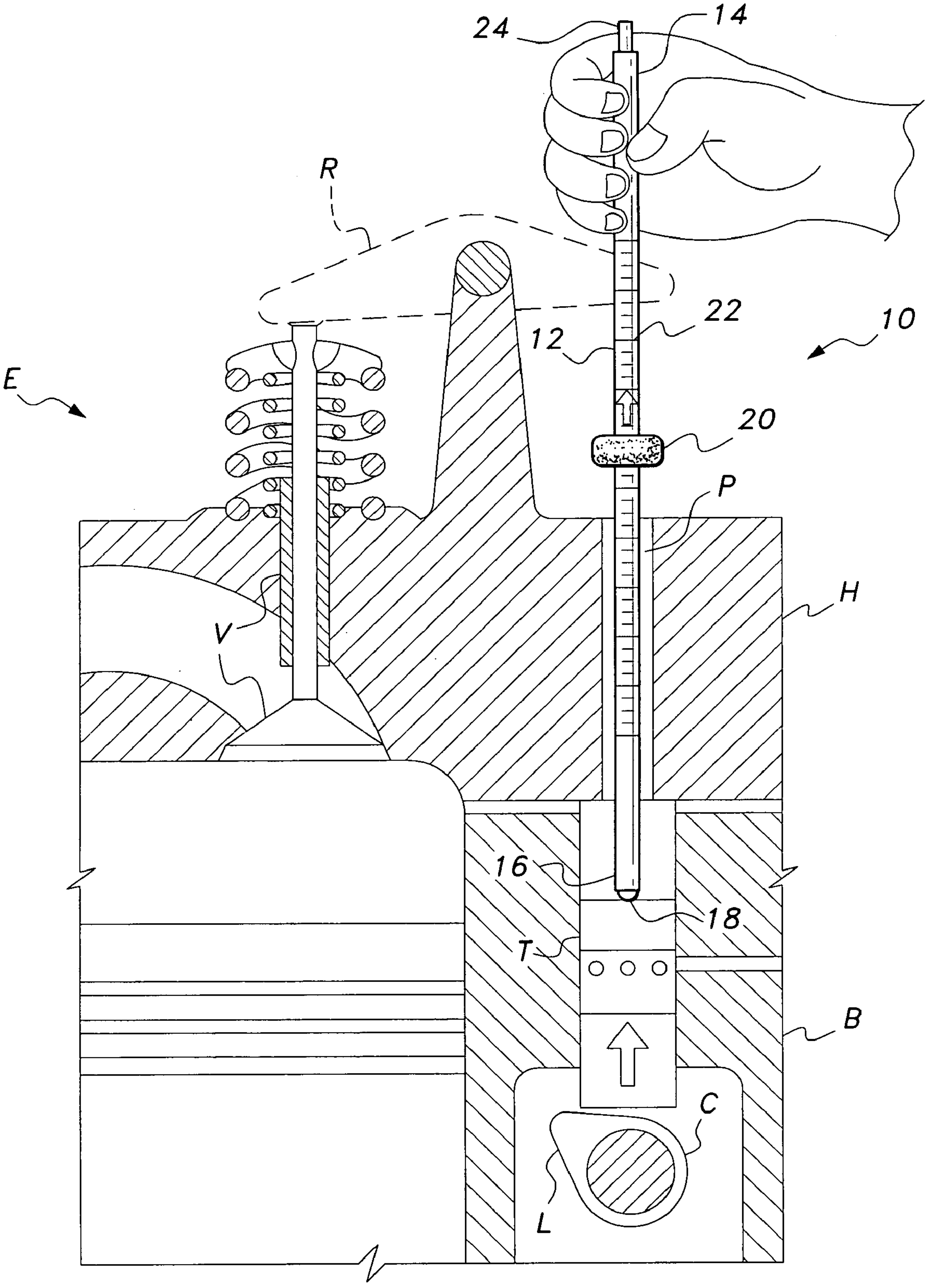
FIG. 1 is an environmental elevation view of a magnetic tool according to the present invention, showing its use in lifting a valve lifter away from a camshaft lobe in an engine.
Figure 3:
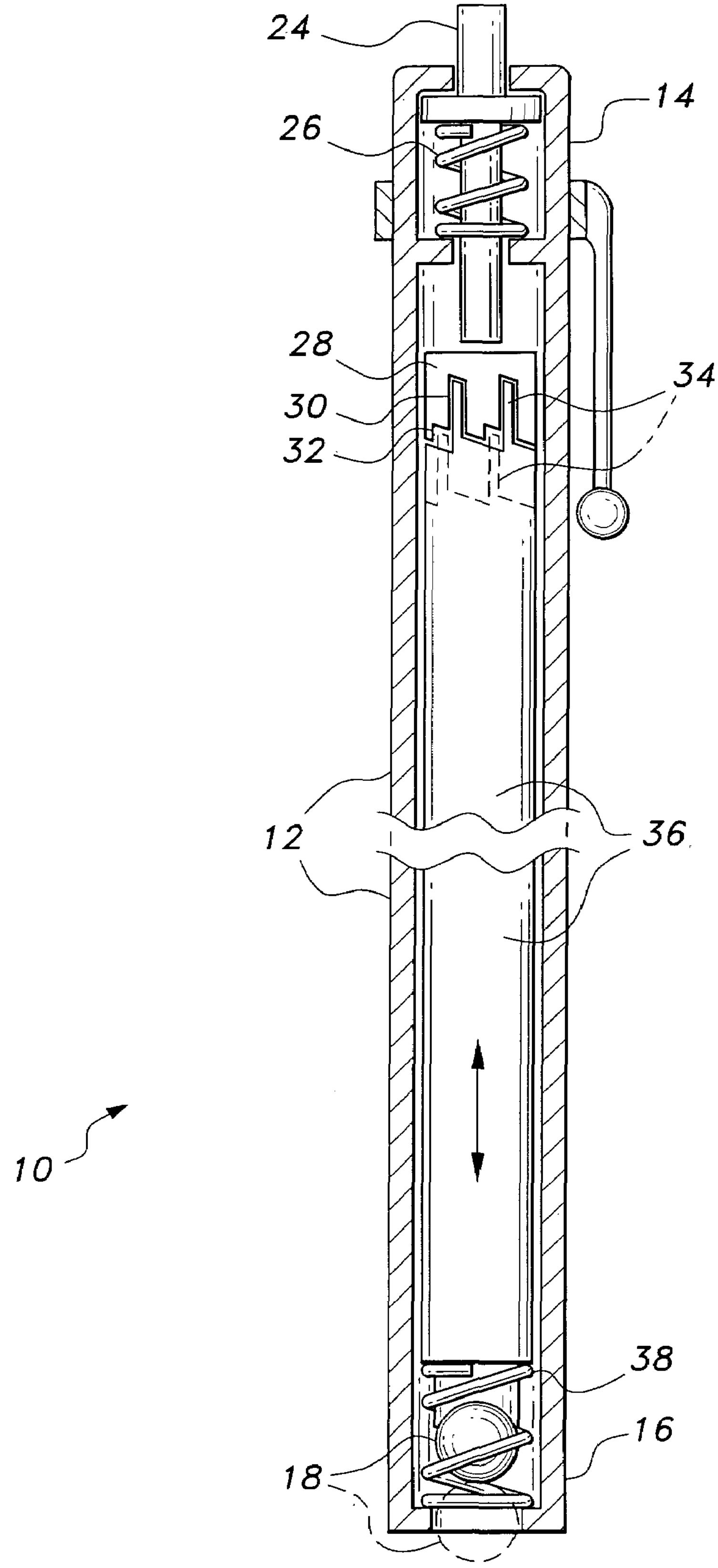
FIG. 3 is a detailed elevation view in section of the tool embodiment of FIGS. 1 and 2, showing the internal mechanism of the device.
Figure 4:
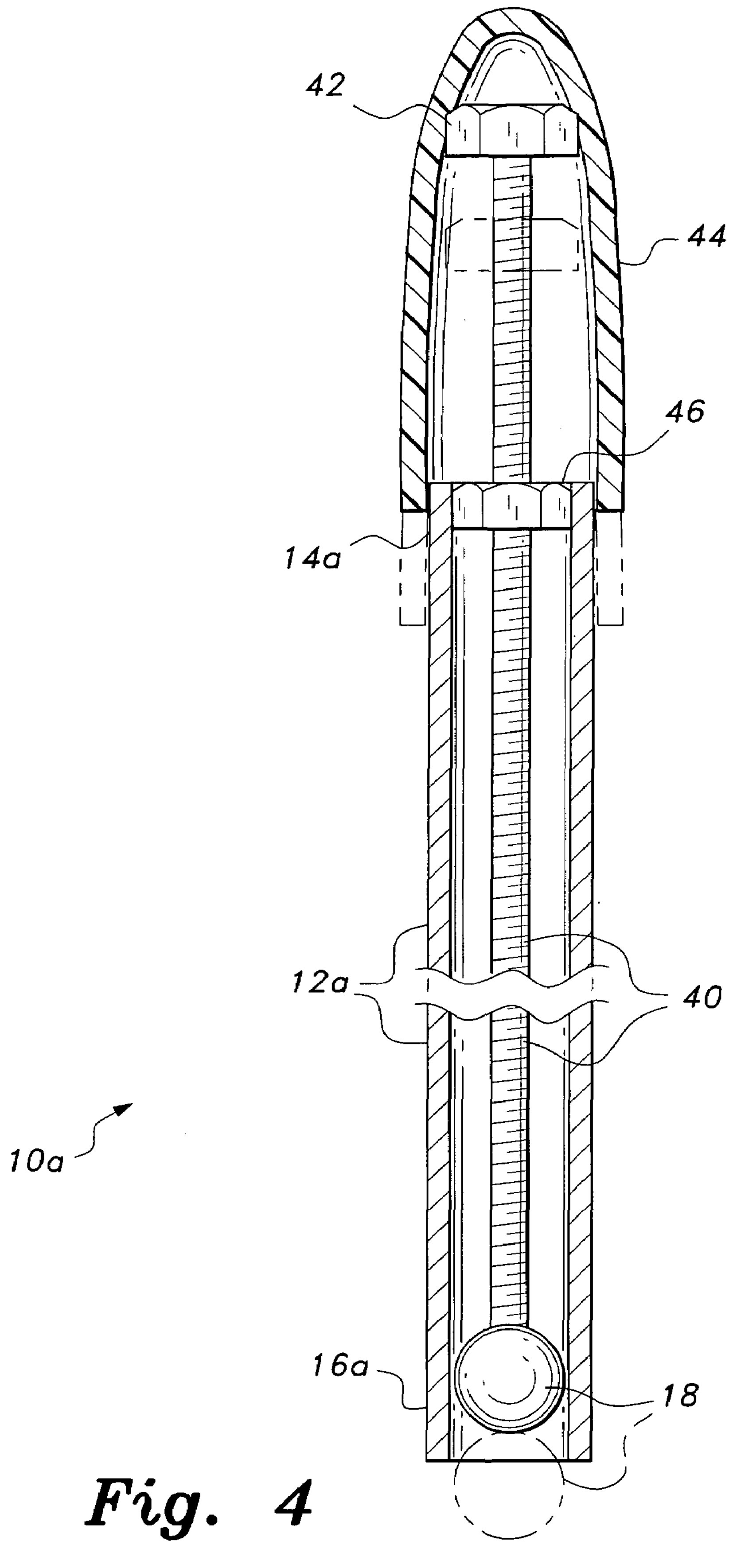
FIG. 4 is a detailed elevation view in section of another embodiment of the present magnetic tool, comprising a threaded extension and retraction rod for the magnet.
Figure 5:
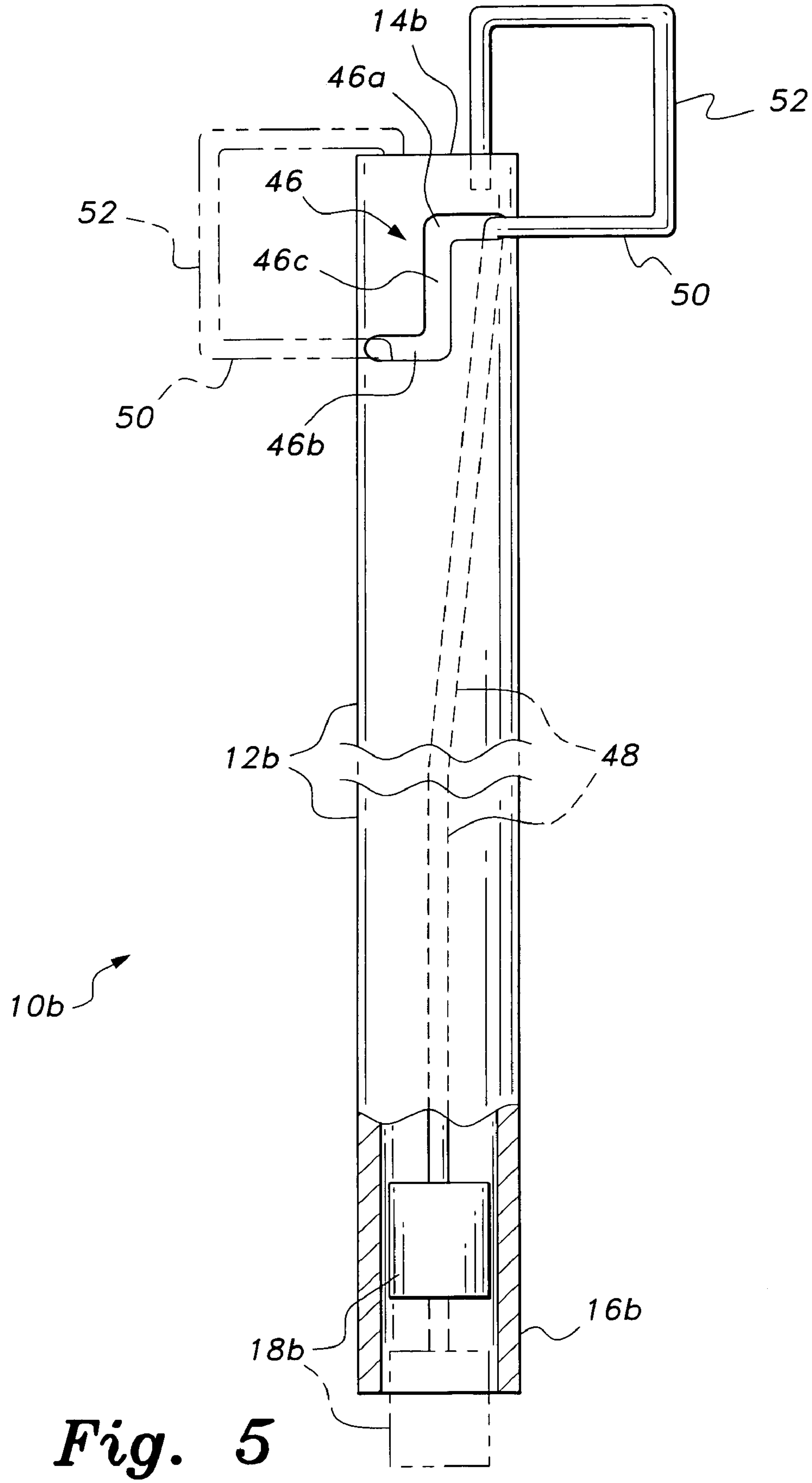
FIG. 5 is a detailed elevation view in partial section of yet another embodiment of the present magnetic tool, having a slot and latch for the extension and retraction of the magnet.

FIG. 1 of the drawings provides an environmental illustration of a first embodiment 10 of the present magnetic tool in use. The tool 10 of FIG. 1, as well as all of the other tool embodiments of the present invention, are based upon a narrow, elongate, rigid, hollow tubular shank 12 having a handgrip end 14 and an opposite working end 16. A small but strong magnet 18 is selectively extendible and retractable from the working end 16 of the tool shank 12. Various mechanisms may be provided for the magnet extension and retraction operation, as shown in FIGS. 3 through 5 and discussed further below.

Figure 2:
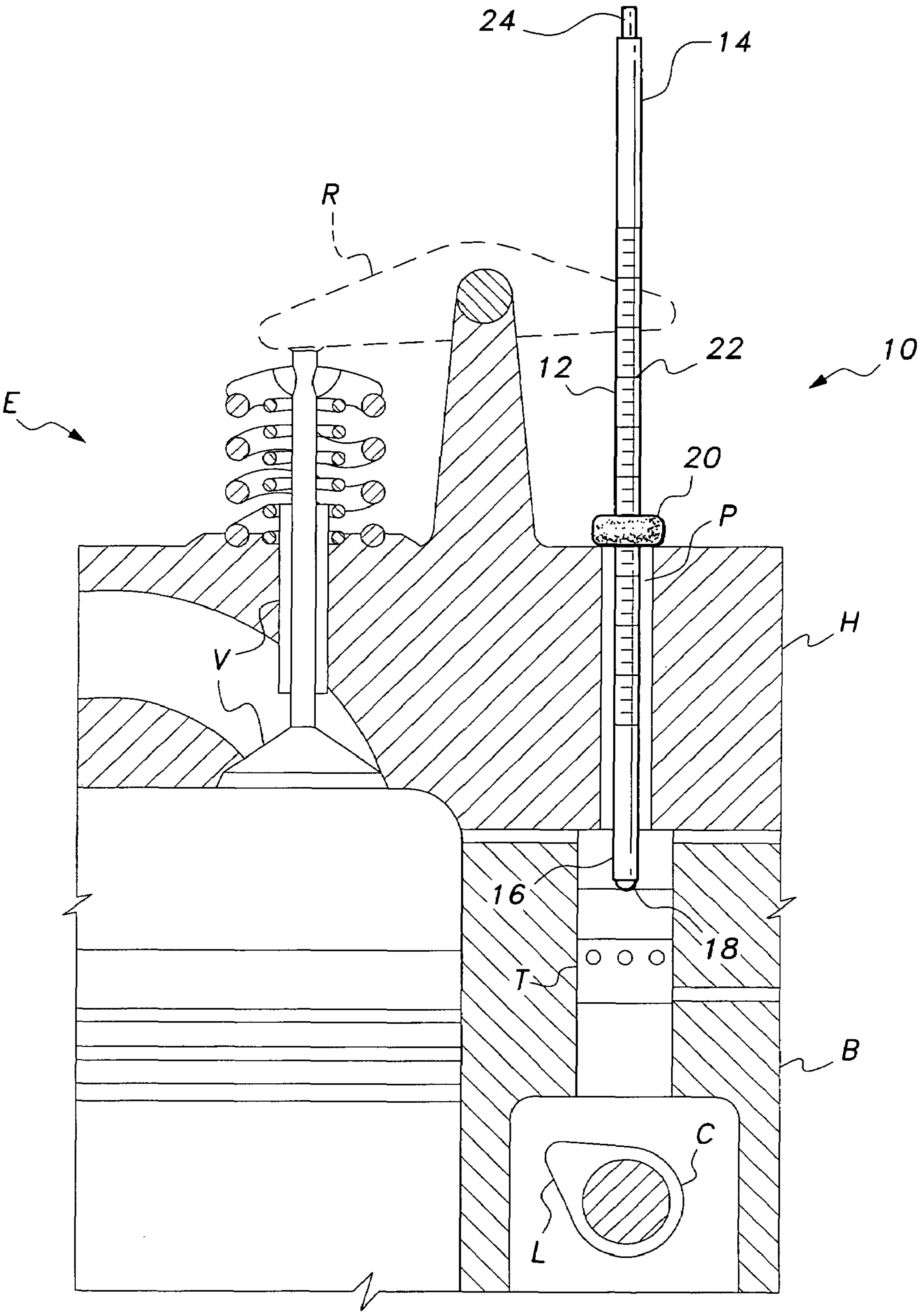
FIG. 2 is an environmental elevation view of the magnetic tool of FIG. 1, showing the tool set in place to hold the lifter clear of the camshaft lobe and bearings.

The present tool 10, and other embodiments thereof, are particularly well adapted for raising and holding a valve lifter or tappet clear of the camshaft in an in-block cam OHV engine, with FIGS. 1 and 2 generally showing the procedure involved. Such engines E include a camshaft passage within the engine block B, with an elongate camshaft C residing in the camshaft passage. Generally, a hydraulic lifter or tappet T rides against each cam lobe L, with the tappet T in turn pushing on a valve pushrod (not shown) which resides in a relatively narrow pushrod passage P formed through the cylinder head H. The pushrod actuates a rocker arm R (shown in broken lines in FIGS. 1 and 2) which in turn operates the overhead valve V in the cylinder. Most OHV engines are equipped with two valves per cylinder, e.g., a six cylinder engine will have twelve valves. Accordingly, the engine will be equipped with twelve tappets T riding upon twelve cam lobes.

When it is necessary to remove the camshaft C for some reason, the lifters or tappets T must be moved in order to clear the cam lobes and relatively large bearing circles as the camshaft C is withdrawn from and replaced within its camshaft passage through the block B. Conventional procedure has been to remove the cylinder head H from the engine block B in order to remove the tappets T from their bores above the cam C. This is a labor intensive process and requires various additional new parts, e.g., head gaskets and various other gaskets and seals, etc. The result is relatively costly in terms of labor, with the additional parts adding further to the cost.

The present invention provides a much easier means of providing clearance between the lifters or tappets T and the cam lobes L and bearings during the camshaft removal and replacement process. When the present tool 10 is used, it is only necessary to loosen the valve adjustment at the rocker arm R, slide the rocker arm R axially along its shaft (or remove the rocker arm R, as desired) to provide access to the pushrod, and remove the pushrod to gain access to the lifter or tappet T through the pushrod passage P. The pushrod passage P is relatively narrow, requiring only sufficient diameter to clear the diameter of the pushrod and some slight lateral movement of the pushrod due to the movement of the rocker arm R. Accordingly, the tappet T cannot be withdrawn completely through the cylinder head H.

However, the tappet T obviously has sufficient clearance in its bore within the engine block B to be lifted to the maximum height of the cam lobe L, as is required during engine operation. Accordingly, the tool 10 may be inserted into the pushrod passage P, with the extended magnet 18 contacting the magnetically attractive tappet T. A person using the present tool 10 then lifts the tool 10 slightly, retracting the tappet T away from the camshaft C to allow the camshaft C to be withdrawn from its passage in the engine block B. When the tappet T has been lifted sufficiently for clearance, as shown in FIG. 2, the tool 10 may be locked in place to hold the tool 10 and magnetically attached tappet T above the cam lobe L, by means of an axially positionable and securable circumferential depth stop collar 20 disposed about the shank 12. The collar 20 may be formed of any of a number of different materials, e.g., an elastomer grommet, hose clamp, pinch collar, etc., as desired, so long as the collar 20 may be adjusted axially along the length of the shank 12 and will hold its position as desired. Alternatively, an external clip or clamp such as a clothespin or the like could be used to hold the shank 12 at the desired position.

The process is repeated for each tappet T and cam lobe L, with the number of tools 10 required being equal to the number of tappets T used in the engine E. A linear depth measurement scale 22 may be provided along the length of the shank 12 to facilitate the determination of the raising of the tappets T to a height or position sufficient to allow withdrawal of the camshaft C. The provision of such a scale 22 assists greatly in the repeatability of the process, as once the proper tappet lift height or position has been determined for a single tappet T, the rest of the tools 10 (or other embodiment) need only be adjusted to maintain the same height or level to assure that all of the tappets T in the engine block B are lifted to a height or level sufficient to clear the cam lobes L and bearings.

When the new or refurbished camshaft C is reinstalled in the engine block B, the tappet T is released from its magnetic attachment to the tool 10. This may be done by withdrawing the tool 10 from its position within the pushrod passage P in the cylinder head H, or alternatively by retracting the magnet 18 into the working end 16 of the tool shank 12. This separates the magnet 18 from the tappet T, allowing the tappet T to return to its rest position against the face of the cam lobe L.

Various mechanisms may be used to selectively retract and extend the magnet 20 in the working end 16 of the tool, as desired. In the case of the tool 10 of FIGS. 1 through 3, a pushbutton mechanism is provided to alternately extend and retract the magnet 18. This mechanism is shown in FIG. 3 of the drawings, and is similar to that used in a conventional retractable ball point pen. The retraction and extension mechanism of FIG. 3 includes an upper pushbutton 24 extending through and captured in the handgrip end 14 of the tool 10. The button 24 is urged to a normal outwardly disposed position by a light compression spring 26, with the inner end of the button 24 bearing against an extension and retraction driver 28.

The driver 28 includes a series of deep and shallow axial slots 30 and 32 formed therein, which engage corresponding fingers 34 in one end of an internal elongate shaft 36 extending from the driver 28 to the magnet 18 at the working end 16 of the tool 10. When the button 24 is pushed inwardly, the driver 28 is rotated slightly by helical grooves or the like (not shown) so that the deep or shallow slots 30 or 32 alternately engage the fingers 34 of the internal shaft 36, to alternately retract and extend the shaft 36 depending upon which of the deep or shallow driver slots 30 or 32 have engaged the shaft fingers 34. A light compression spring 38 within the working end 16 of the tool 10 urges the internal shaft 36, and its attached magnet 18 to a normally retracted position, depending upon the state of the extension and retraction driver and shaft relationship selected by the pushbutton 24.

FIG. 4 provides an elevation view in section of another means of selectively retracting the magnet within the working end of the tool. In FIG. 4, a tool **10*a* includes a shank 12*a* having a handgrip end, 14*a* and working end 16*a*. The basic difference between the tool shank 12*a* of FIG. 3 and the tool shank 12 of FIGS. 1 through 3, is that due to the different magnet extension and retraction mechanism of the tool 10*a* of FIG. 3, no internal retaining flanges are required for springs for the tool 10*a*. The tool 10*a* of FIG. 3 has an elongate threaded advance and retraction rod 40 extending from a point beyond the handgrip end 14*a* to connect to the magnet 18 at the working end 16*a*. The rod 40 includes a head 42 immovably affixed to the end of the shaft 40 extending beyond the handgrip end 14***a*. A cap, knob, or similar gripping means 44 may be immovably affixed to the rod head 42.

An internally threaded collar, nut, or similar component 46 is immovably affixed within the handgrip end 14*a* of the tool shank 12*a*. The threaded rod 40 turns within the nut or collar 46 to threadibly advance or retract, depending upon the direction of rotation of the rod 40 by means of its head 42 and cap or knob 44. This action either extends or retracts the magnet 18 within the working end 16*a* of the tool shank 12*a*, as indicated by the retracted position of the magnet 18 shown in solid lines and its extended position shown in broken lines in FIG. 4.

Alternatively, the external shank 12*a* may be formed as two components and threaded together, with the magnet immovably affixed to the handgrip end by an internal rod. Unthreading the working end from the handgrip end of such a tool extends the working end to cover the magnet, in effect retracting the magnet. Threading the two shank components back together shortens the shank assembly, thereby extending the magnet from the working end of the shortened tool shank. Such a two part threaded shank may be incorporated with any of the embodiments of the present tool, in order to provide for separation of an article being held by the magnet from the magnet, in the event that the retraction mechanism (e.g., the pushbutton system of FIGS. 1 through 3) does not provide sufficient retractile force to pull the magnet up into the working end of the tool when it is magnetically attached to another object.

FIG. 5 provides an illustration of yet another magnet retraction and extension means in a tool 10*b*. The tool 10*b* includes an elongate, narrow, hollow tubular shank 12*b* capable of fitting through a pushrod passage in an engine cylinder head, as in the other tool embodiments of the present invention. The shank 12*b* has a handgrip end 14*b* and opposite working end 16*b*, with a magnet 18*b* being selectively retracted within and extended from the working end 16*b* of the tool 10*b*. The magnet of the tool 10*b* is indicated with the indicator 18*b*, rather than 18 as used to identify the magnets of the tools illustrated in FIGS. 1 through 4, solely due to its different shape. It will be seen that the shape of the magnet used is not critical, so long as it is sufficiently narrow to fit within the narrow internal diameter of the narrow tool shank in its various embodiments.

The handgrip end 14*b* of the tool 10*b* includes a generally Z-shaped slot 46 therein, with the slot having an upper horizontal portion 46*a*, a lower horizontal portion 46*b*, and a vertical portion 46*c* connecting the upper and lower portions 46*a* and 46*b*. A latch rod 48 extends from the handgrip end 14*b* of the tool 10*b*, and extends internally through the shank 12*b* to connect to the magnet 18*b* at the working end 16*b* of the tool 10*b*. The upper or handgrip end of the latch rod 48 includes a lateral portion 50 which extends outwardly through the slot 46 to terminate in a gripping loop 52, or other configuration suitable for gripping by the user of the tool 10*b*. When the lateral portion 50 of the latch rod 48 is moved laterally into the upper horizontal slot portion 46*a*, the rod 48 lifts the magnet 18*b* to retract it into the working end 16*b* of the tool shank 12*b*, as shown in solid lines in FIG. 5.

When it is desired to extend the magnet 18, the gripping portion 52 of the latch rod 48 is swiveled arcuately about the handgrip end 14*b* of the shank 12*b* to move the laterally extending portion 50 of the rod into the vertical slot 46*c*. The lateral portion 50 of the rod 48 is slid downwardly through the vertical portion 46*c* and swiveled arcuately into the lower horizontal portion of the slot 46 to lock it into position, thereby also lowering the rod 48 within the tubular shank 12*b* of the tool 10*b* and extending the magnet 18*b* from the working end 16*b* of the tool 10*b*. Retraction of the magnet 18*b* is accomplished by reversing the movement of the latch rod lateral extension 50 and handgrip portion 52.

Figure 6:
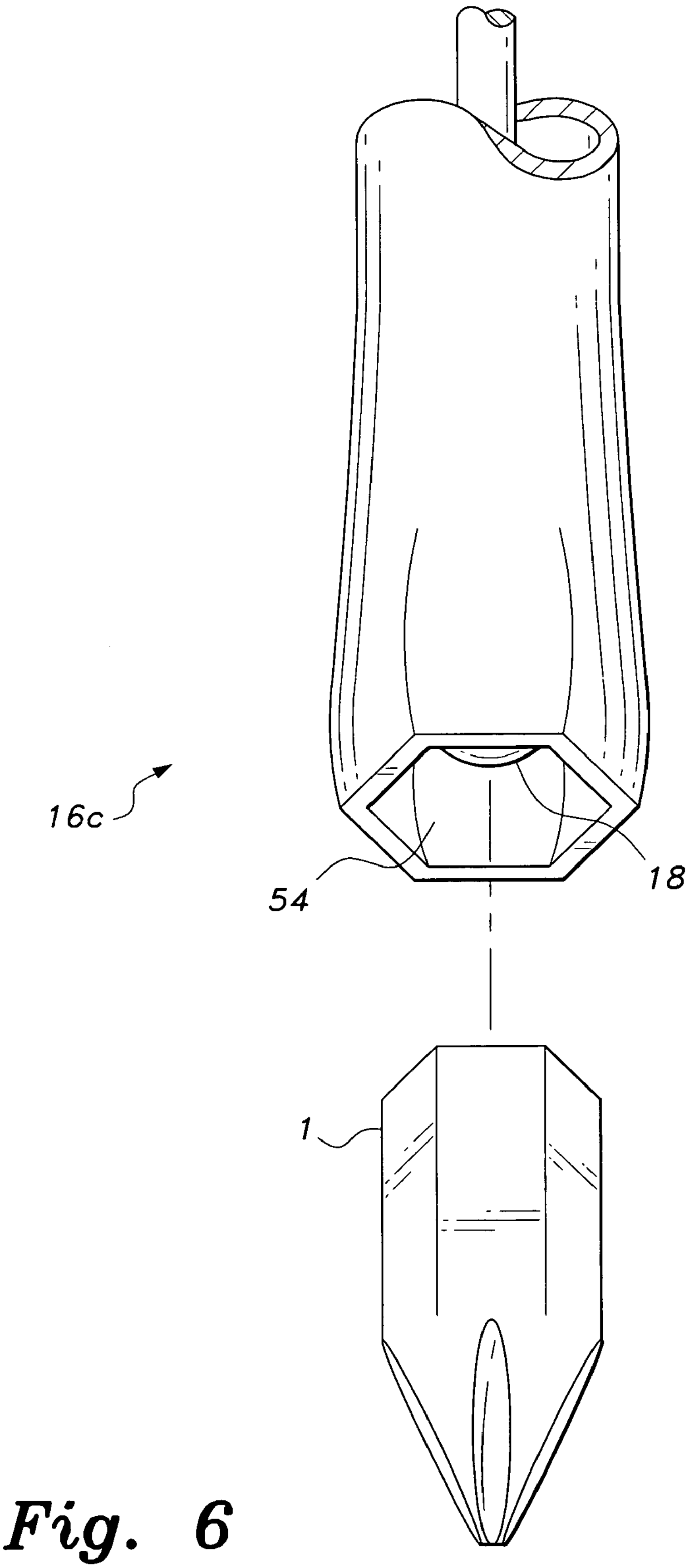
FIG. 6 is a detailed perspective view of the working end of another embodiment of the present magnetic tool, having a hexagonal receptacle for accepting tool bits therein.
Figure 7:
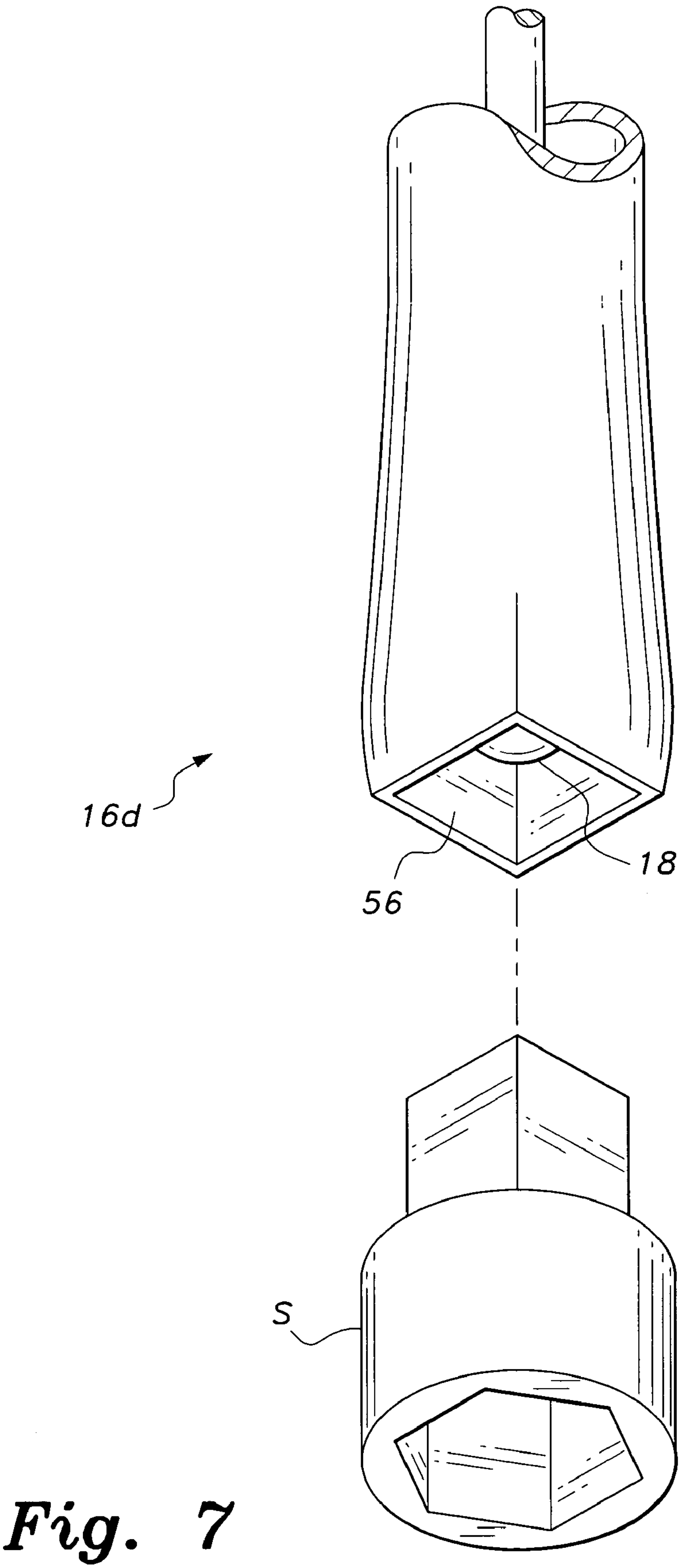
FIG. 7 is a detailed perspective view of the working end of yet another embodiment of the present magnetic tool, having a square receptacle for accepting square drive sockets therein.

FIGS. 6 and 7 illustrate alternative working ends for the various tool shank embodiments of the present invention. In FIG. 6, the working end 16*c* has been reconfigured from a circular cross section to form a receptacle 54 having hexagonal cross section. This provides for the selective insertion or removal of a conventional hexagonally shaped tool bit insert I, e.g., a Phillips or other screwdriver bit, Allen drive, or other insert having a cooperatingly shaped base for insertion into such a hexagonal receptacle. In FIG. 7, the working end 16*d* of the tool has been reshaped to form a square section receptacle 56. The square receptacle 56 may accept quarter inch drive sockets S, or other sockets or inserts having compatible connecting ends or fittings. Other polygonal configurations may be formed in the working end of any of the tool embodiments of the present invention as desired, depending upon the type of tool insert or component to be used therewith.

In each case, the magnet 18 (or other magnet configuration therein) is retracted to provide a suitable receptacle 54 or 56 for the tool bit or component to be installed, with the magnet holding the component in place within the receptacle 54 or 56 until it is positively removed therefrom by the user of the tool. Some form of larger diameter handgrip (not shown) may be provided on the handgrip end of the tool as desired, for greater leverage in manipulating the tool when using it with a tool bit insert or the like. The only critical restriction regarding such a larger diameter handgrip is that it not extend so far down the tool shank that it precludes insertion of the shank into a pushrod passage to a sufficient depth to reach a valve lifter or tappet within the engine block.

In conclusion, the present invention in its various embodiments provides a much improved means to facilitate the removal and installation of a camshaft in an engine having an in-block camshaft. The present tool completely eliminates the requirement to remove the cylinder head(s) from the block to access the valve lifters or tappets in order to raise them clear of the camshaft so the camshaft may be withdrawn or installed in the block. The labor savings, as well as the savings in parts and materials (new head gaskets, etc.) will pay for a series of the present tools in short order.

In addition to the above advantages, the reshaping of the working end of the tool to form a hexagonal or square receptacle enables the present tool to be used with a number of other tool bits, sockets, and the like. The reshaping of the working end of the tool does not preclude its use as a valve lifter or tappet retraction tool, but adds greater versatility to the tool in addition to its function in retracting the lifters in an engine. The various functions and advantages provided by the present tool in its various embodiments, provide a versatility and utility which will be greatly appreciated by the amateur and professional mechanic alike.

It is to be understood that the present invention is not limited to the embodiments described above, but encompasses any and all embodiments within the scope of the following claims.

I claim:

1. A magnetic tool, comprising:

a narrow, elongate, rigid tubular shank having a handgrip end and a working end opposite the handgrip end;

a selectively extendible and retractable magnet disposed within the working end of said shank;

a polygonal tool bit receptacle formed in the working end of said shank;

a magnet extension and retraction mechanism disposed within said tubular shank, and extending between the handgrip end and the working end of said shank; and an axially positionable and securable circumferential depth stop collar disposed about said shank.

2. The magnetic tool according to claim 1, wherein said shank and the working end thereof have a diameter providing for removable insertion through a pushrod bore in the cylinder head of an overhead valve engine, for magnetically retracting a valve lifter away from the lobe of a camshaft for facilitating removal of the camshaft from the engine.

3. The magnetic tool according to claim 1, further including a linear depth measurement scale disposed upon said shank.

4. The magnetic tool according to claim 1, wherein said extension and retraction mechanism comprises a pushbutton mechanism disposed within said working end of said shank.

5. The magnetic tool according to claim 1, wherein said extension and retraction mechanism comprises a threaded advance and retraction rod extending through said shank between the working end thereof and said magnet.

6. The magnetic tool according to claim 1, wherein said extension and retraction mechanism comprises a latch rod selectively engaging a slot disposed within the working end of said shank.

7. A magnetic tool, comprising:

a narrow, elongate, rigid tubular shank having a handgrip end and a working end opposite the handgrip end;

a selectively extendible and retractable magnet disposed within the working end of said shank;

a polygonal tool bit receptacle formed in the working end of said shank;

a magnet extension and retraction mechanism disposed within said tubular shank, and extending between the handgrip end and the working end of said shank;

an axially positionable and securable circumferential depth stop collar disposed about said shank; and a linear depth measurement scale disposed upon said shank.

8. The magnetic tool according to claim 7, wherein said shank and the working end thereof have a diameter providing for removable insertion through a pushrod bore in the cylinder head of an overhead valve engine, for magnetically retracting a valve lifter away from the lobe of a camshaft for facilitating removal of the camshaft from the engine.

9. The magnetic tool according to claim 7, wherein said extension and retraction mechanism comprises a pushbutton mechanism disposed within said working end of said shank.

10. The magnetic tool according to claim 7, wherein said extension and retraction mechanism comprises a threaded advance and retraction rod extending through said shank between the working end thereof and said magnet.

11. The magnetic tool according to claim 7, wherein said extension and retraction mechanism comprises a latch rod selectively engaging a slot disposed within the working end of said shank.

* * * * *